(No Model.)

E. B. A. ZWOYER & G. W. AUGE.
FISHERMAN'S POLE REST.

No. 358,527. Patented Mar. 1, 1887.

Witnesses
T. Walter Fowler
Ellen P. Kinsey

Inventors
Elsworth B. A. Zwoyer,
George W. Auge,
By their Attorney
Thomas P. Kinsey N. PETERS, Photo-Lithographer, Washington, D. C.

UNITED STATES PATENT OFFICE.

ELLSWORTH B. A. ZWOYER AND GEORGE W. AUGE, OF READING, PA., ASSIGNORS OF ONE-THIRD TO WELLINGTON VANREED, OF SAME PLACE.

FISHERMAN'S POLE-REST.

SPECIFICATION forming part of Letters Patent No. 358,527, dated March 1, 1887.

Application filed October 7, 1886. Serial No. 215,616. (No model.)

*To all whom it may concern:*

Be it known that we, ELLSWORTH B. A. ZWOYER and GEORGE W. AUGE, both citizens of the United States, residing at the city of Reading, county of Berks, State of Pennsylvania, have invented a new and useful Improvement in Fishermen's Pole-Rests, of which the following is a specification.

This improvement is more particularly intended for the use of the professional fisherman. At the same time it will be found to be a great relief and convenience to the amateur fisher.

The object of the improvement is to furnish to the fisherman a rest adapted to receive the pole-butt, which may be readily adjusted to hold the pole at any desired angle with the stream, and which may be conveniently secured at any point upon the shore by simply pressing the sharpened end of the rest-shank into the soil.

The drawings herewith show clearly the nature of the improvement and the mode in which it is applied, similar letters of reference indicating like parts.

Figure 1:
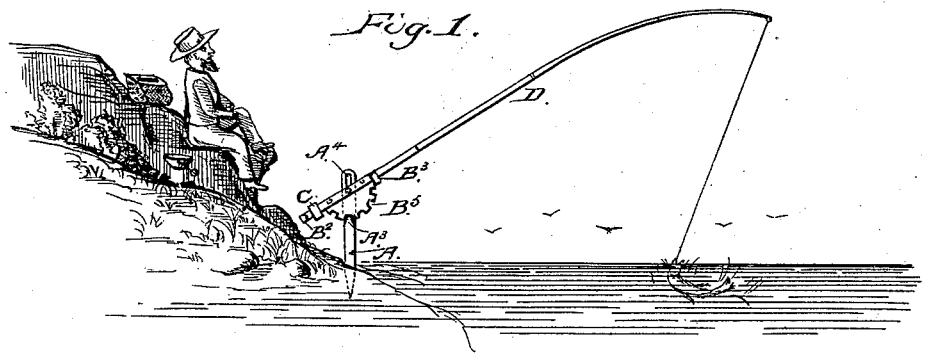
Figure 2:
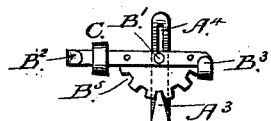
Figure 3:
Figure 4:
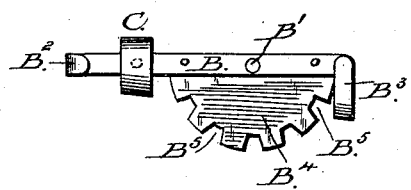
Figure 5:
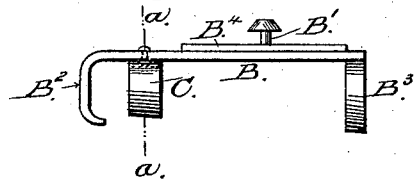
Figure 6:

Figure 1 represents a fisherman seated at ease, with the pole supported in the rest; Fig. 2, an elevation of the complete pole-rest; Fig. 3, a side elevation of the shank detached from the pole-rest, showing the formation of the keeper-wedge; Fig. 4, an enlarged front elevation of the pivotal pole-rest; Fig. 5, a top plan of the same; Fig. 6, a section through the retainer-ring in line $a\,a$ of Fig. 5, showing more clearly the sliding pivotal pin.

We find practically that a shank, A, of about five-sixteenth-inch round or square iron and about fifteen inches in length meets the wishes of the majority of fishermen. This shank we sharpen at $A'$, so as easily to penetrate the soil, and flatten at $A^2$, to form a support to the swinging arm B, forming at $A^3$ a keeper-wedge adapted to lock with the notches $B^5$ of said swinging arm. An oblong slot, $A^4$, permits the pivotal center $B'$ of the swinging arm B to rise therein clear of said keeper-wedge, for a purpose disclosed further on.

The swinging arm B has a segmental portion, $B^4$, provided with a series of peripheral notches, $B^5$, adapted to lock upon the keeper-wedge $A^3$, and has a pivotal center-pin, $B'$, adapted to slide freely in the slot $A^4$ of the shank. The rear portion of the arm $B^2$ is recurved to receive the thrust of the pole-butt, while the front portion, $B^3$, is curved upward to form a rest for the pole. A retainer-ring, C, is pivoted at $C'$ near the rear end, through which the butt of the pole D is passed.

The arm B we usually form from one-eighth-inch by three-eighth-inch iron and the segmental portion of one-sixteenth-inch plate riveted to the same; but the arm and its segment may be stamped in one integral piece.

The operation of the device is as follows: The fisherman, provided with a rest for each pole he purposes using, upon arriving at the stream, inserts the shank in the shore. Having baited his hook and thrown his line, he inserts the butt of the pole in the pivoted ring C, with its end against $B^2$, and resting in the curved seat $B^3$. Then, raising the segmental notches $B^5$ above the keeper-wedge $A^3$, he holds the pole at the desired angle and drops the same with the swinging arm B attached, so that one of the notches $B^5$ vertically above the keeper-wedge $A^3$ shall rest upon the same, when the arm B and pole D will be held without further attention. The pole is easily withdrawn from the arm and as easily returned, the adjustment having once been made; or the angle of the pole relative to the stream may be repeatedly changed at the moment of throwing the line.

This invention will be found a great convenience to the fisherman, particularly upon a sandy shore, where the usual recourse of the fisherman for a pole-rest—a pile of stones—is not readily found.

Having shown our improvement, described its construction, use, and advantages, we desire to claim as follows:

1. As a new article of manufacture for the use of fishermen, a pole-rest consisting, essentially, of the following elements: a shank pointed at its lower end, having a flattened oblong perforated top, and integral therewith a keeper-wedge at the base of said perforation, an arm pivoted to slide freely in said oblong perforation, provided with a central segmental peripheral notched portion, and having the rear end of the arm horizontally recurved to form an abutment for the end of the pole and its forward end vertically recurved to form a seat or rest for the pole, together with a retainer-ring pivoted near the recurved rear end, as and for the purpose set forth.

2. The combination of a fishing pole or rod with a pivotal sliding arm, as shown and described, the peripheral notches of its segmental portion being adapted to be releasably locked upon the keeper-wedge of the shank and the angle of the pole to the stream readily adjustable by raising the notches clear of the wedge and dropping the desired notch upon said wedge, as and for the purpose set forth.

ELLSWORTH B. A. ZWOYER.
GEORGE W. AUGE.

Witnesses:
CHAS. ROWET,
JOHN M. SHARP.